United States Patent
Choi et al.

(10) Patent No.: US 9,824,033 B2
(45) Date of Patent: Nov. 21, 2017

(54) METHOD AND DEVICE OF HEAP SORTING BASED ON A MEMORY DEVICE

(71) Applicants: INDUSTRY ACADEMIC COOPERATION FOUNDATION OF YEUNGNAM UNIVERSITY, Gyeongsangbuk-do (KR); INDUSTRY-ACADEMIC COOPERATION FOUNDATION, KUNSAN NATIONAL UNIVERSITY, Jeollabuk-do (KR)

(72) Inventors: Gyu Sang Choi, Daegu (KR); Byung Won On, Jeollabuk-do (KR); In Gyu Lee, Incheon (KR)

(73) Assignees: INDUSTRY ACADEMIC COOPERATION OF YEUNGNAM UNIVERSITY, Gyeongsangbuk-Do (KR); INDUSTRY-ACADEMIC COOPERATION FOUNDATION, KUNSAN NATIONAL UNIVERSITY, Jeollabuk-Do (KR)

( * ) Notice: Subject to any disclaimer, the term of this patent is extended or adjusted under 35 U.S.C. 154(b) by 0 days.

(21) Appl. No.: 15/146,803

(22) Filed: May 4, 2016

(65) Prior Publication Data
US 2016/0334993 A1   Nov. 17, 2016

(30) Foreign Application Priority Data
May 14, 2015   (KR) ........................ 10-2015-0067407

(51) Int. Cl.
G06F 12/02   (2006.01)
G06F 13/00   (2006.01)
G06F 7/22    (2006.01)

(52) U.S. Cl.
CPC ................ G06F 13/00 (2013.01); G06F 7/22 (2013.01)

(58) Field of Classification Search
CPC ................ G06F 9/50; G06F 12/02; G06F 3/06
USPC ........................................ 711/173
See application file for complete search history.

(56) References Cited

U.S. PATENT DOCUMENTS

| | | | |
|---|---|---|---|
| 6,411,957 B1* | 6/2002 | Dijkstra ............ | G06F 17/30961 707/752 |
| 6,415,279 B1 | 7/2002 | Gard et al. | |
| 7,987,214 B2* | 7/2011 | Ylonen ............... | G06F 12/0253 707/797 |
| 2008/0181139 A1* | 7/2008 | Rangarajan ....... | G06F 17/30961 370/256 |
| 2013/0297904 A1* | 11/2013 | Stanfill .................. | G06F 12/02 711/165 |
| 2016/0261875 A1* | 9/2016 | Zheng .................. | H04N 19/176 |

FOREIGN PATENT DOCUMENTS

| KR | 20010041803 | 5/2001 |
|---|---|---|
| KR | 20050060553 | 6/2005 |

* cited by examiner

*Primary Examiner* — Pierre-Michel Bataille
(74) *Attorney, Agent, or Firm* — Blakely Sokoloff Taylor & Zafman LLP

(57) ABSTRACT

The present application relates to a heap sorting method based on arrangement and apparatus which can improve the heap sorting conducting speed through reducing access (I/O) frequency of the external memory when conducting heap sorting through storing binary data in the basic access unit of the external memory device in reference to the subtree unit.

5 Claims, 7 Drawing Sheets

METHOD AND DEVICE OF HEAP SORTING BASED ON A MEMORY DEVICE

CROSS-REFERENCE TO RELATED APPLICATION(S)

This application claims the benefit under 35 USC 119(a) of Korean Patent Application No. 10-2015-0067407 filed on May 14, 2015 in the Korean Intellectual Property Office, the entire disclosure of which is incorporated herein by reference for all purposes.

BACKGROUND

1. Field

The following description relates to a heap sorting method based on arrangement and a data sorting method and apparatus thereof which improves heap sorting function by reducing I/O access of a memory.

2. Description of Related Art

Heap sort is a sorting method which uses a material structure called heap comprised of a binary tree, i.e., heap. It sorts data by comparing data of respective nodes. The heap sorting conducts data sorting by comparing the value of a parent node and a child node after comprising the maximum heap having the parent node value higher than that of the child node by determining the root node as a maximum value or after comprising minimum heap having the parent node value smaller than that of the childe node by determining the root value as the minimum value in converse.

FIG. 1 is a diagram schematically illustrating the access (I/O) between an external memory 110 and a main memory 120.

As illustrated in FIG. 1, the memory devices 110 and 120 has a basic access unit 140 according to shapes and they are operated in reference to the basic access unit 140 when the computer read and write data through accessing the memory devices 110 and 120.

When the size of the whole data which is the sorting subject during heap sorting is not big, the whole data can be transmitted to the main memory 120 of the computer through access (I/O, Input/Output) to the memory device 110. However, when the size of the whole data is big, the whole data cannot be transmitted to the main memory 120, thereby the data should be transmitted through accessing the external memory device 110 every time when conducting calculation for heap sorting.

Herein, the speed accessing the external memory device 110 is relatively slow thereby, the higher frequency of accessing the external memory, the slower the conducting speed of the heap sorting would be.

FIG. 2 is a diagram illustrating a data storing method of heap sorting according to a related art.

As illustrated in FIG. 2A, in the heap sorting according to a related art is stored in an order of second level from the root node 210 in reference to the basic access unit 140 of the memory 110.

As illustrated in FIG. 2B, when the size of the basic access unit 140 is 1024 KB, the heap sorting according to a related art is stored in the external memory device 110 to the level which satisfies 1024 KB from the root node 210 as the starting point. Further, the data from the second level to the level satisfying the 1024 KB is stored in the external memory device 110.

The heap sorting conducts sorting by comparing the parent node and the child node while, the heap sorting data storing method according to a related art stores the data of the parent node and child node in a different basic access unit 140 thus, the access (I/O) frequency in regards to the external memory device 110 increases. When the access (I/o) frequency in regards to the external memory device 110 increases, a lot of time is consumed in transmitting data thereby, there is a problem of slowing conducting speed of the whole heap sorting.

Especially, it can be a huge problem of data processing when the heap sorting conducting speed slows down in regards to a system of processing huge data like big data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description provides a heap sorting method and apparatus thereof based on a memory device which can reduce external memory access (I/O) frequency when conducting heap sorting.

The heap sorting method according to the following description includes a heap sorting comprising which sorts the data with a binary tree; a subtree dividing which divides the heap tree with a subtree of a predetermined size; a memory storing which stores the data in the memory device with the reference unit of the subtree.

Further, a measuring which measures the size of the basic access unit of the memory device is further included.

Further, the size of the subtree can be identical with the size of the basic access unit of the memory device.

Herein, the memory device may be an external memory device which includes a flash memory or a hard disk.

Further, the subtree dividing is characterized by dividing with a lower subtree in reference to a root node.

Further, a determining which determines whether the size of the data comprising the lowest subtree among the subtree satisfies the size of the basic access unit may be further included.

Further, a level unit dividing which divides the data included in the lowest subtree in a level unit when the size of the data which comprises the lowest subtree is smaller than the size of the basic access unit.

The heap sorting method and apparatus based on the memory device can improve the heap sorting conducting speed through reducing access (I/O) frequency of the external memory when conducting heap sorting through storing binary data in the basic access unit of the external memory device in reference to the subtree unit.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
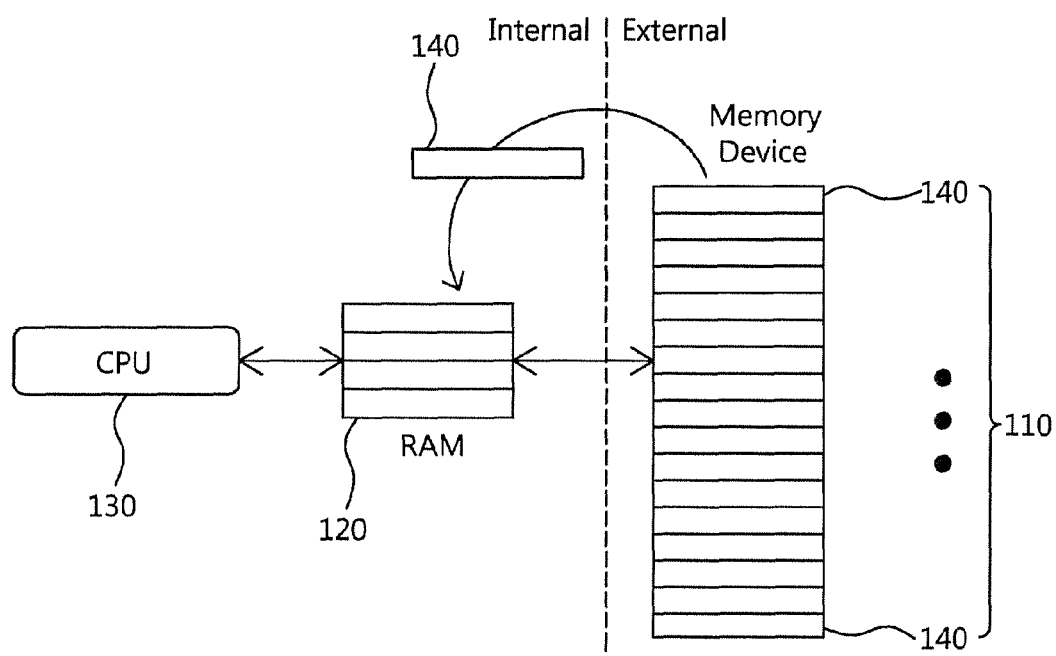
FIG. 1 is a diagram illustrating a data storing method of heap sorting in a related art.
Figure 2A:
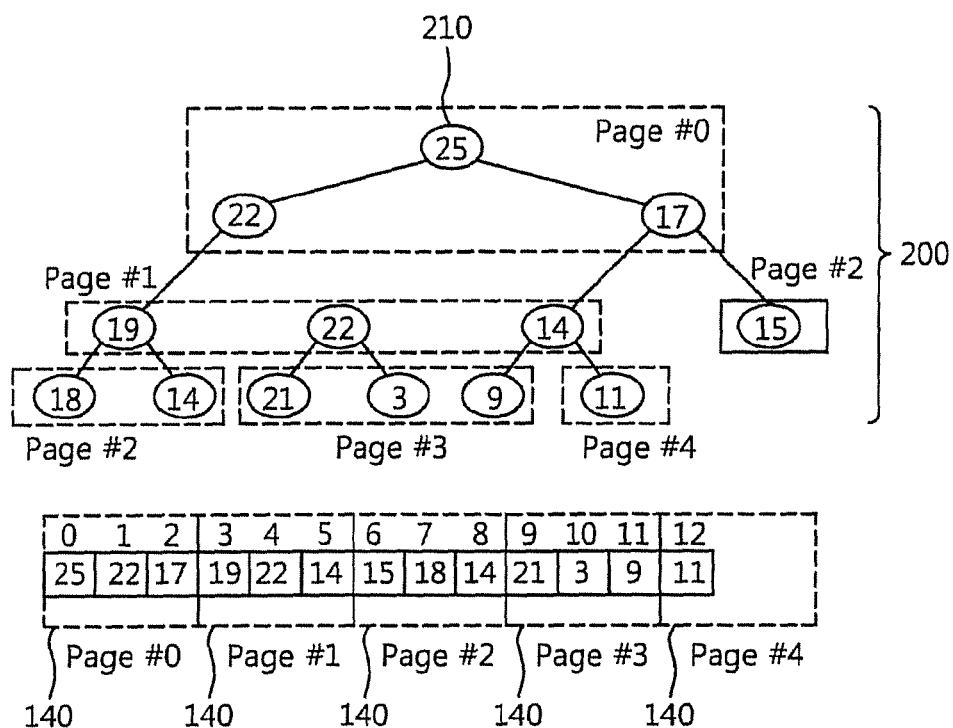
FIG. 2A is a schematic diagram illustrating an access between the main memory and the external memory.
Figure 2B:
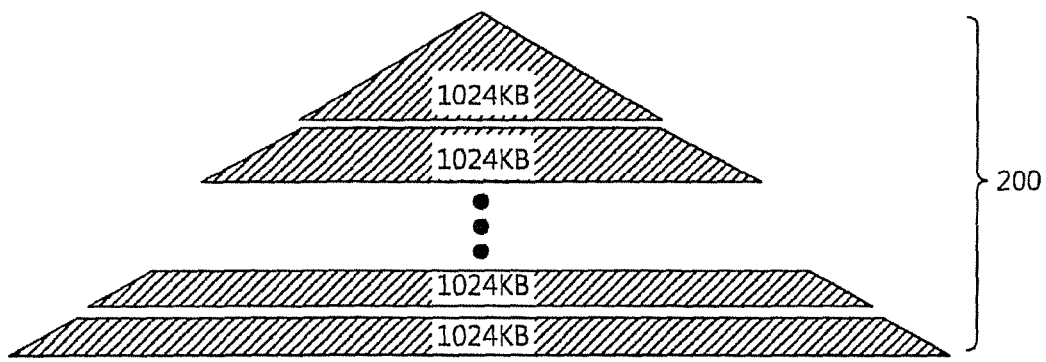
FIG. 2B is a schematic diagram illustrating an access between the main memory and the external memory.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Certain examples are now described in greater detail with reference to the accompanying drawings.

In the following description, the same drawing reference numerals are used for the same elements even in different drawings. The matters defined in the description, such as detailed construction and elements, are provided to assist in a comprehensive understanding of the present examples. Accordingly, it is apparent that the examples are potentially carried out without those specifically defined matters. Also, well-known functions or constructions are not described in detail since they would obscure the invention with unnecessary detail.

Figure 3:
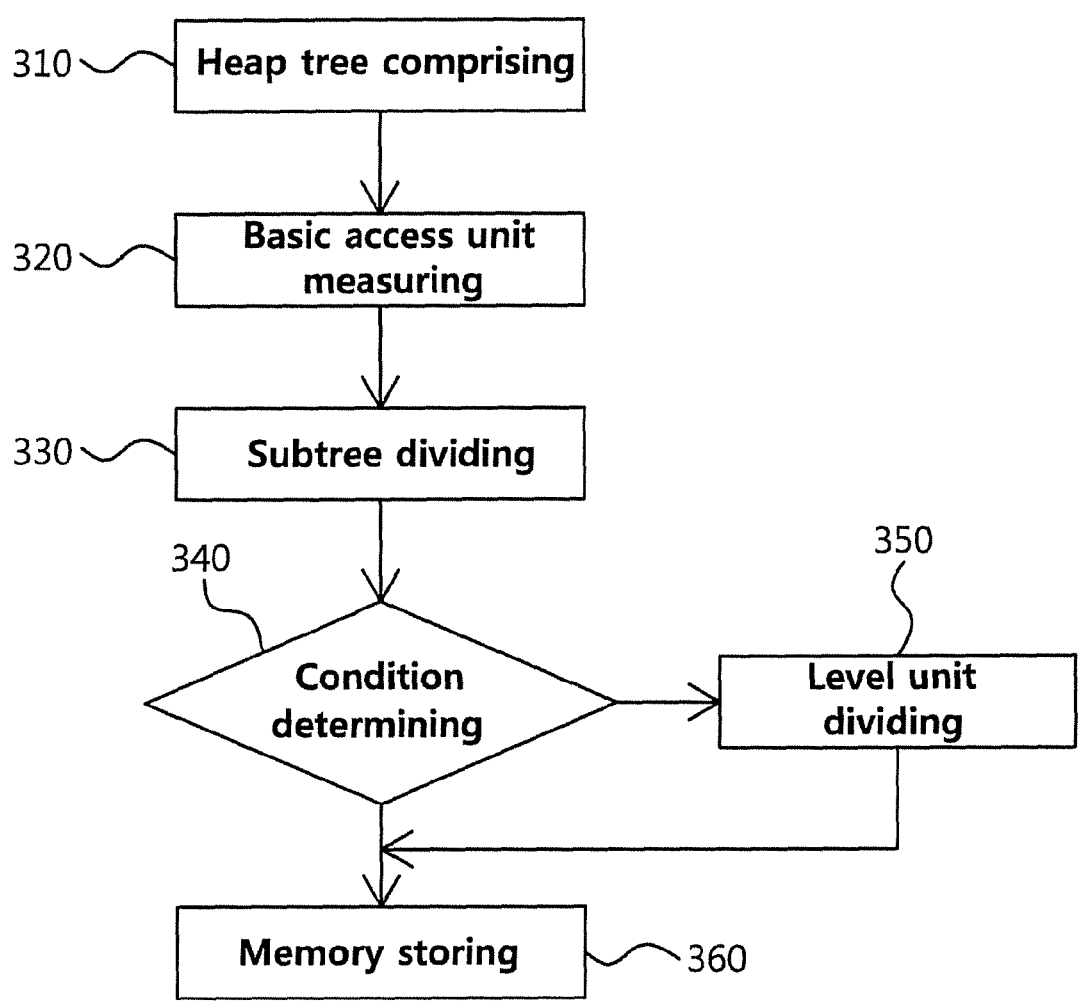
FIG. 3 is a flow chart illustrating the order of the heap sorting method.

FIG. 3 is a flow chart illustrating an order of the heap sorting method 300 according to an embodiment.

As illustrated in FIG. 3, the heap sorting method 300 according to an embodiment includes a heap tree comprising 310 which comprises a binary tree 200 in subject to data which is subject to sorting; a measuring 320 which measures the size of the basic access unit 140 of the external memory device 110; a subtree dividing 330 which divides the binary tree 200 into a subtree 220 from the root node to the leaf node in reference to a size of the basic access unit 140; a determining 340 which determines whether the size of the data stored in the lowest subtree 220 satisfies the size of the basic access unit 140; a level unit dividing 350 which divides the data stored in the lowest subtree 220 in a level unit 230 when the lowest subtree 220 does not satisfy the above condition in the determining 340, and a memory storing 360 which stores the data which is divided into the subtree 220 and the level unit 230 in the external memory device 110 with a basic access unit 140.

The heap tree comprising 310 which sorts the data in a binary tree 200 has two lower child nodes in reference to a root node 210 of data in subject to sorting. Further, the child nodes becomes a parent node and comprises a tree with a method of having two child nodes each. Herein, when the root node is determined as a maximum value and the binary tree 200 comprising the parent node value higher than the child node is a maximum heap. In converse, when the root node is determined as a minimum value and the binary tree 200 comprising the parent node value lower than the child node is a minimum heap.

The basic access unit measuring 320 measures the size of the basic access unit 140 comprising the external memory device 110. The basic access unit 140 becomes the reference which determines the size of the subtree 220 in the aftermentioned subtree dividing 330. The size of the data which is stored in the external memory 140 can be optimized through storing the data by dividing into a size of a basic access unit 140. Further, the amount of data which is transmitted when accessing (I/O) the external memory device 110 can be maximized during heap sorting.

FIG. 3 illustrates heap sorting method 300 including a basic access unit measuring 320 in reference to determine the size of the subtree 220. However, the size of the subtree 220 may not have to be limited to reference access unit 140 and it can be variously determined according to computing environment which conducts heap sorting.

For example, the NAND flash memory conducts read operation and write operation with a page unit and an erase operation is conducted with a block unit and when the external memory device 110 is a NAND flash memory, the page can be a basic access unit 140. The basic access unit 140 is not necessarily limited to a page of a NAND flash memory and can differ according to the type and shape of the external memory device 110.

The subtree dividing 330 determines the size of the subtree 220 according to the size of the basic access unit 140 which is measured in the basic access unit measuring 320 and it divides storing unit of the data comprising the binary tree 200 with a subtree 220 in reference to the root node 210. Hereinafter, illustrates regarding the subtree dividing 330 referring to FIG. 4.

FIG. 4 is a diagram schematically illustrating a binary tree 200 which is divided with a subtree 220 according to an embodiment.

Figure 4A:
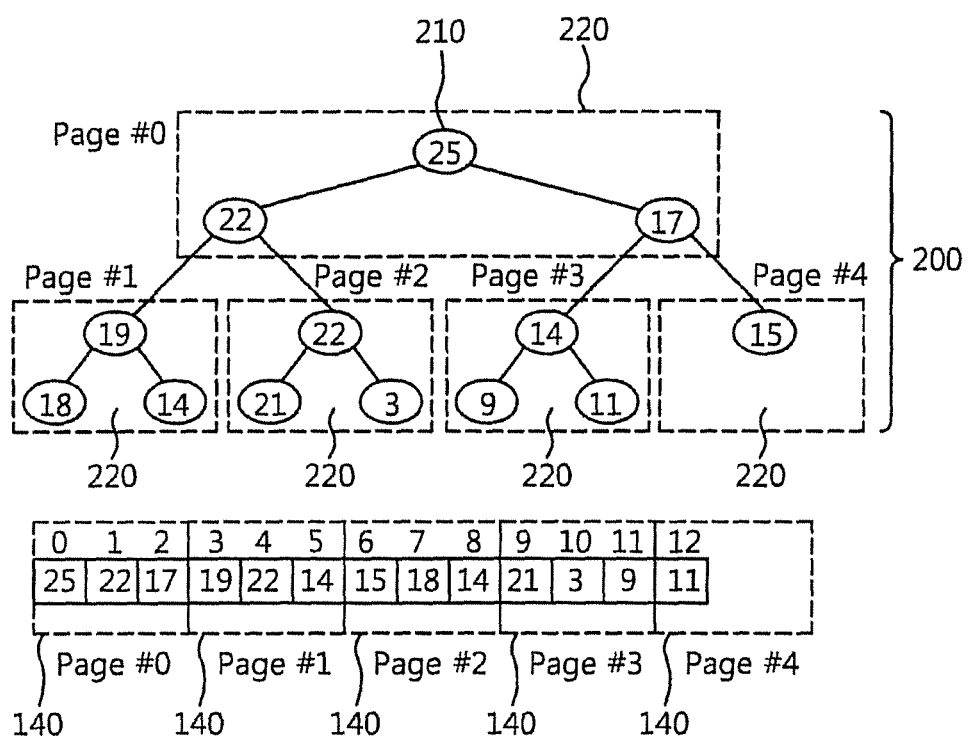
FIG. 4A is a schematic diagram illustrating a binary tree which is divided in to subtree.

As illustrated in FIG. 4A, provided that the size of the basic access unit 140 is the size which the value of three nodes can be stored, the divided region can be determined with a subtree 220 with one parent node and two child nodes. The divided subtree 220 comprises the highest subtree 220 in reference to the root node 210 and the subtree 220 is comprised in reference to the lowest nodes.

Figure 4B:
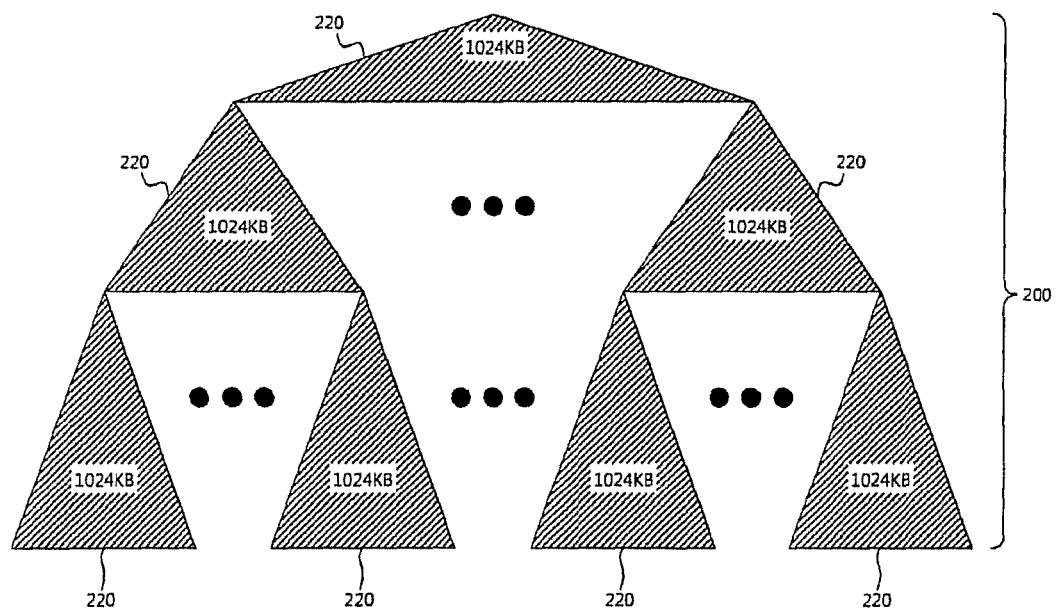
FIG. 4B is a schematic diagram illustrating a binary tree which is divided in to subtree.

As illustrated in FIG. 4B, when the size of the basic access unit 140 is 1024 KB, a highest subtree 220 comprises in reference to the root node 210 and the subtree 220 comprises in reference to the lowest nodes included in the highest subtree 220. Herein, the maximum number of the lowest subtree 220 which can be connected to the lowest unit of the highest subtree 220 is determined by the number of the lowest node of the highest subtree 220. That is, when the number of the highest node comprising the highest subtree 220 is 256, up to 256 of the subtree 220 can be connected to the lowest node.

As afore-mentioned, the size of the subtree 220 can be determined in reference to the size of the basic access unit 140 of the external memory device 110, however, it does not have to be limited thereto and can be determined variously such as considering the size of the main memory 120.

The determining 340 determines whether the size of the data comprising the lowest subtree 220 satisfies the size of the basic access unit 140 of the external memory device 110. Hereinafter illustrates regarding determining 340 referring to FIG. 5.

Figure 5:
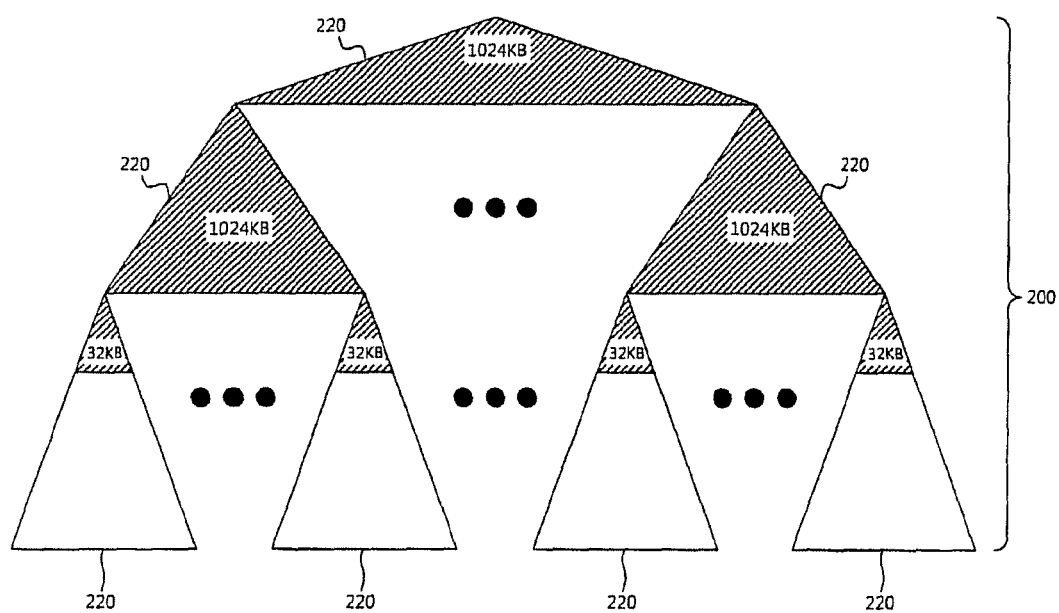
FIG. 5 is a diagram illustrating a binary tree when the data size of the lowest subtree does not satisfy the basic access unit.

FIG. 5 is a diagram illustrating the binary tree 200 when the data size of the lowest subtree 220 does not satisfy the basic access unit 140.

As illustrated in FIG. 5, provided that the size of the basic access unit 140 is 1024 KB, the highest subtree 220 in reference to the root node 210 and the lowest subtree 220 has a data size which satisfies the size of the basic access unit 140 however, the size of the lowest subtree 220 is merely 32 KB and does not satisfy the basic access unit 140 which is 1024 KB. Accordingly, when determining, after determining whether the data size of the lowest subtree 220 satisfies the size of the basic access unit 140, it determines whether to conduct level unit dividing 350 according to the determination result.

During level unit dividing 350, when the data size of the lowest subtree 220 does not satisfy the size of the basic access unit 140 according to the determining 340 result, the storing unit is changed from the subtree 220 structure to the level unit 230 structure. Hereinafter illustrates level unit dividing 350 referring to FIG. 5 and FIG. 6.

As illustrated in FIG. 5, the data size of the lowest subtree 220 does not satisfy the size of the basic access unit 140, thereby the lowest subtree 220 has the subtree 200 structure released in the level unit dividing 350. The data in state of the subtree 220 structure is released has the storing unit structure changed to the level unit 230.

Figure 6:
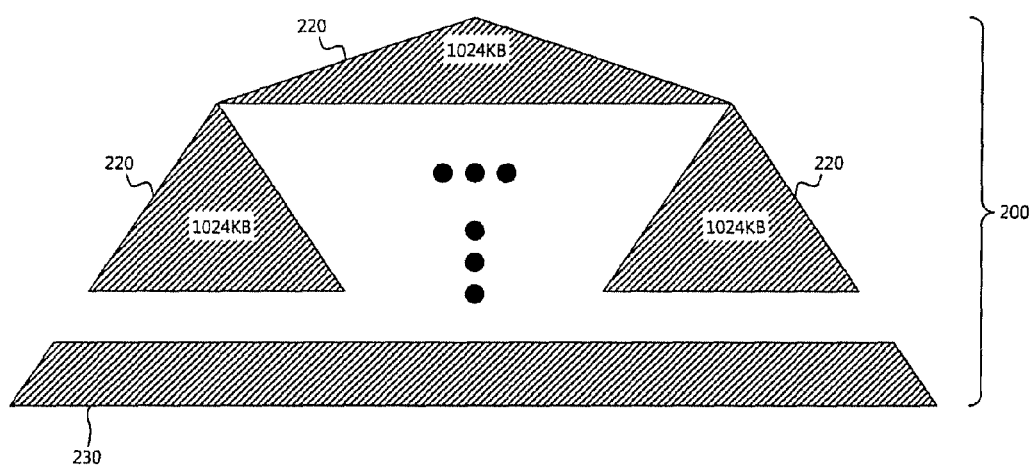
FIG. 6 is a diagram illustrating a binary tree of a shape which the lowest subtree structure is altered to a level unit.

FIG. 6 is a diagram illustrating a binary tree 200 of a shape changing the lowest subtree 220 structure to a level unit 230.

As illustrated in FIG. 6, although the lowest subtree 220 is comprised in reference to the root node 210, it comprises with a level unit 230 and not a subtree 220 structure in the lowest unit of the binary tree 200. Likewise, in case the data size of the lowest subtree 220 does not satisfy the size of the basic access unit 140, when comprising the storing unit with a subtree 220 structure, it decreases efficiency since the using rate of the basic access unit 140 of the external memory device increases. For example, only 32 KB is stored in basic access unit 140 which can store 1024 KB and since the used number of basic access unit 140 increases, efficiency decrease. On the other hand, when changing the storing unit structure from the lowest subtree 220 to the level unit 230, it can be used as a storing unit which satisfies the size of the basic access unit 140 and the use of further smaller basic access unit 140 is possible.

FIG. 3 illustrates the method of only determining whether the data size of the lowest subtree 220 satisfies the size of the basic access unit 140, however, it can use a method which determines the data size of the lowest subtree 220 in the condition of predetermined satisfying rate. For example, it can determine whether the data size of the lowest subtree 220 satisfies 75% of the basic access unit 140 and herein, when the size of the basic access unit 140 is 1024 KB, the determining reference during determining can be determined as 768 KB.

That is, the higher the determining reference, the higher the efficiency of the external memory device 110, whereas there is higher possibility of the parent node and the childe node to be stored in a different basic access unit 140. Accordingly, the heap sorting conducting speed may slow down. In converse, the lower the determining reference, the higher the efficiency of the external memory device 110 however, the heap sorting conducting speed may improve.

The memory storing 360 stores the data which comprises the binary tree 200 in the external memory device 110 in reference to the subtree 220 and the level unit 230. Herein, when the size of the subtree 220 and the level unit 230 are determined with the size of the basic access unit 140, the subtree 220 and the level unit 230 can be stored in one basic access unit 140 respectively.

When the data is stored with a heap storing method according to an embodiment, it is stored in one basic access unit 140 in reference to the subtree 220, thereby there is a high possibility of storing the parent node and child node in one basic access unit 140. Accordingly, during heap sorting, it is enough to transmit the subtree 220 which is connected along one route to the lowest unit in reference to the root node to compare the data of the parent node and the child node and, the heap sorting conducting speed is improved since the frequency to access the external memory device 110 decreases.

Figure 7:
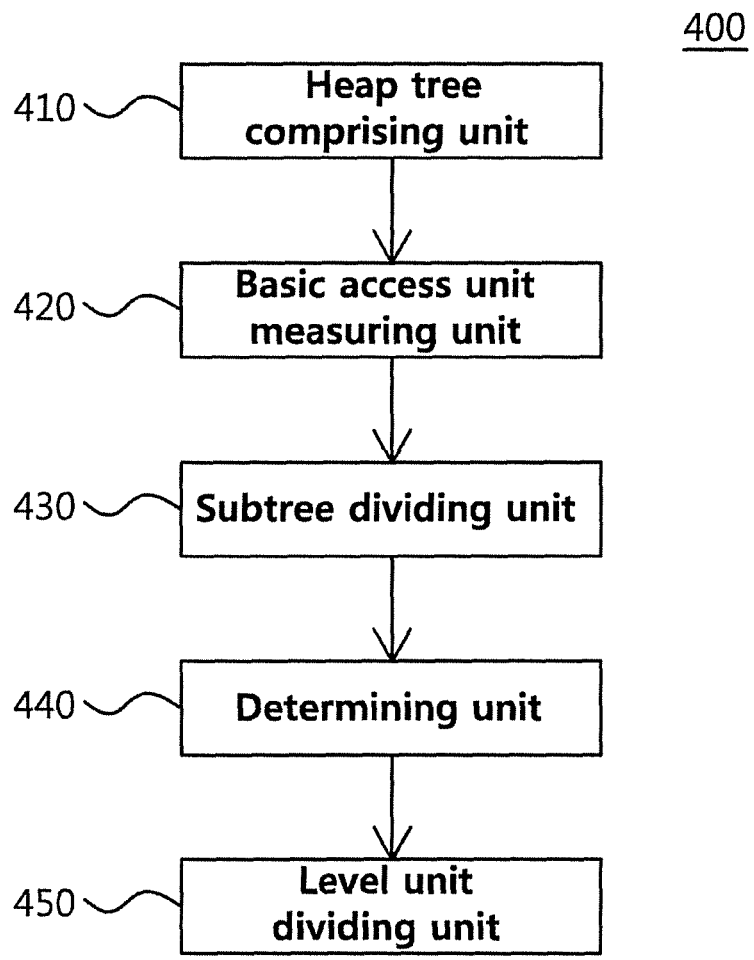
FIG. 7 is a diagram illustrating a heap sorting device according to an embodiment.

FIG. 7 is a diagram illustrating a heap sorting device 400 according to an embodiment.

As illustrated in FIG. 7, the heap sorting device 400 according to an embodiment includes a heap tree comprising unit 410 configured to comprise a heap tree comprising a binary tree 200 in subject to the data for sorting; a measuring unit 420 configured to measure the size of the basic access unit 140 of the external memory device 110; a subtree dividing unit 430 configured to divide the binary tree 200 with a subtree 220 from the root node to a leaf node in reference to the size of the basic access unit 140; a determining unit configured to determine whether the size of the data stored in the lowest subtree 200 satisfies the size of the basic access unit 140; and a level unit dividing unit 350 configured to divide the data stored in the lowest subtree 220 with a level unit 230 if the lowest subtree 220 does not satisfy the above condition in the determining unit 440.

The heap sorting device 400 according to an embodiment may improve the heap sorting conducting speed by reducing frequency of accessing the external memory device 110 by conducting heap sorting method according to an embodiment as illustrated in FIG. 3 to FIG. 6.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A heap sorting device comprising,
   a heap tree unit configured to include a heap tree including a binary tree having data;
   a measuring unit configured to measure the size of a basic access unit of a memory device;

a subtree dividing unit configured to divide the binary tree with a subtree having the size of the basic access unit;

a determining unit configured to determine whether the size of the data stored in a lowest subtree satisfies a predetermined determination reference; and, a level unit dividing unit configured to divide the data stored in the lowest subtree with a level unit if the lowest subtree does not satisfy the predetermined determination reference.

2. The heap sorting device of claim 1 wherein the determination reference determines whether determination reference satisfies the size of the basic access unit.

3. A heap sorting method comprising, a heap tree sorting data with a binary tree;

dividing the heap tree into a subtree of a predetermined size;

storing the data in a memory device in a reference unit of the subtree;

measuring the size of a basic access unit of the memory device;

determining whether the size of the data comprising a lowest subtree among the subtree satisfies a determining reference; and, dividing the data included in the lowest subtree with a level unit when the size of the data comprising the lowest subtree is smaller than the size of the basic access unit.

4. The heap sorting method of claim 3, wherein the size of the subtree is identical with the size of the basic access unit of the memory device.

5. The heap sorting method of claim 4, wherein the determining comprises determining whether the determining reference satisfies the size of the basic access unit.

* * * * *